March 20, 1973 YOTARO MIURA ETAL 3,721,772
TAPE CASSETTE WITH A REMOVABLY MOUNTED ERASURE PREVENTION
MEANS HAVING TWO OPERATIVE POSITIONS
Filed July 20, 1970 3 Sheets-Sheet 1

INVENTORS
YOTARO MIURA
YOSHIHARU MATSUMOTO
BY
Lewis H. Eslinger
ATTORNEY

INVENTORS
YOTARO MIURA
YOSHIHARU MATSUMOTO
BY
Lewis H. Eslinger
ATTORNEY

INVENTORS
YOTARO MIURA
YOSHIHARU MATSUMOTO
BY
Lewis H. Eslinger
ATTORNEY

United States Patent Office 3,721,772
Patented Mar. 20, 1973

3,721,772

TAPE CASSETTE WITH A REMOVABLY MOUNTED ERASURE PREVENTION MEANS HAVING TWO OPERATIVE POSITIONS

Yotaro Miura and Yoshiharu Matsumoto, Tokyo, Japan, assignors to Sony Corporation, Tokyo, Japan Filed July 20, 1970, Ser. No. 56,484
Claims priority, application Japan, July 22, 1969 (utility model), 44/69,661
Int. Cl. G11b *15/04*
U.S. Cl. 179—100.2 D 5 Claims

ABSTRACT OF THE DISCLOSURE

A tape cassette for use in a tape recording and reproducing apparatus having a switch adapted to be engaged by the cassette for controlling the recording circuit of the apparatus and placing the recording circuit in its operative and inoperative modes. The cassette has a safety device adapted to be removably mounted on the cassette in at least two operative positions and has first and second switch control surfaces which are selectively adapted to engage the switch, thereby maintaining the switch in one of its two operative positions to select the mode of the recording circuit.

This invention relates generally to a tape cassette for use in tape recording and reproducing apparatus, and more particularly to a tape cassette having a safety device adapted to control the recording circuit of the apparatus to prevent inadvertent erasure of pre-recorded information on the tape therein.

Tape cassettes of the above type have previously been proposed which include an integral safety device adapted to prevent inadvertent erasure of pre-recorded information on the tape contained within the cassette. One such device is the well known "Phillips" type cassette having a frangible tab on the back edge thereof which is adapted to engage a microswitch in the tape recording and reproducing apparatus when the cassette is positioned at the recording and reproducing station therein. The microswitch controls the recording circuit of the apparatus and includes an operating arm or lever which is engaged by the tab to close the switch and complete the recording circuit so that new information may be recorded on the tape or previously recorded information may be erased. When it is desired to retain the information recorded on the tape and prevent erasure thereof the tab may be removed to form an aperture in the cassette. Thus, in the event that the cassette is placed within the recording and reproducing apparatus, the aperture would be presented to the microswitch in lieu of the tab, so that the switch would not be closed and the recording circuit of the apparatus would thence remain in its inoperative mode wherein it would be impossible to record over the previously recorded information and thereby erase that information from the tape.

While cassettes of the above described type have been generally satisfactory, it is noted that once the tab on the rear of the device is broken, it is no longer possible to re-record on the tape in that cassette. Therefore, in the event that the recorded information thereon should later become unnecessary, the tape and the cassette must either be disposed of, or repaired. The methods presently used for repairing such cassettes are temporary at best and are relatively expensive. Further, due to the location and configuration of the tabs in such cassettes, it is often difficult to break the tab.

Accordingly, it is an object of the present invention to provide a safety device on tape cassettes to prevent inadvertent erasures of pre-recorded information thereon.

It is a further object of the present invention to provide a safety device for reusable tape cassettes to prevent inadvertent erasures of pre-recorded information and permit later erasure of the information and reuse of the cassette.

It is a still further object of the present invention to provide a relatively inexpensive and simply constructed reusable tape cassette having a safety device for preventing inadvertent erasures of pre-recorded information.

In accordance with an aspect of this invention, a tape cassette is provided for use in tape recording and reproducing apparatus having a switch member, adjacent the recording and reproducing station of the apparatus, for selectively placing the recording circuit of the apparatus in its operative and inoperative modes. The cassette includes a safety device or switch control means formed with a pair of switch control surfaces adapted to engage the actuator arm of the switch and thus maintain the switch in its respective operative positions. The safety device is removably mounted in the cassette so that each of the control surfaces may be selectively engaged with the control switch to maintain the switch in one of its operative positions to thereby control the operative mode of the recording circuit.

In one embodiment, the control member is a generally flat disc having a recess therein which is offset from the central axis of the disc. In one position the actuating arm of the control switch engages the flat surface of the disc whereby the switch is closed and the recording circuit is completed so that information may be recorded on the tape. By removing the disc from the cassette and turning it 180°, the switch control arm is engaged within the recess in the disc so that the switch is open and the recording circuit is placed in its inoperative mode whereby inadvertent erasure of pre-recorded information on the tape is not possible. In another embodiment of the invention the control member is a disc having a generally arcuate cross-section and the disc is adapted to be mounted with either of its opposite faces engaged with the actuator arm of the control switch. Since each of the faces of the disc extends a different distance from the surface of the cassette, the switch will be selectively placed in one or the other of its operative positions to control the recording circuit of the apparatus.

The above, and other objects, features and advantages of this invention will be apparent in the following detailed description of an illustrative embodiment thereof which is to be read in connection with the accompanying drawings wherein.

Figure 1:
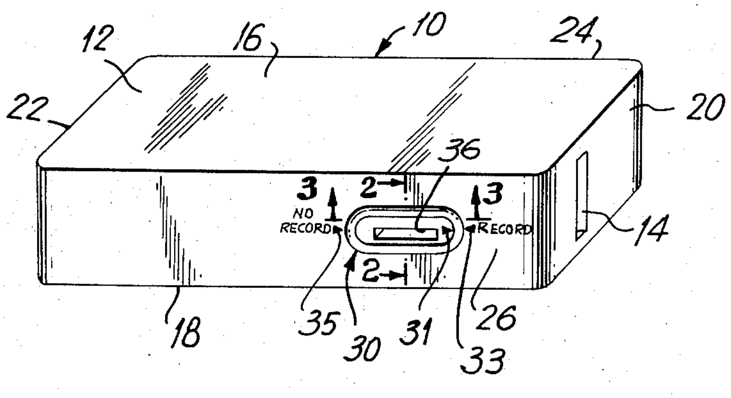
FIG. 1 is a perspective view of a tape cassette according to an embodiment of the present invention.
Figure 2:
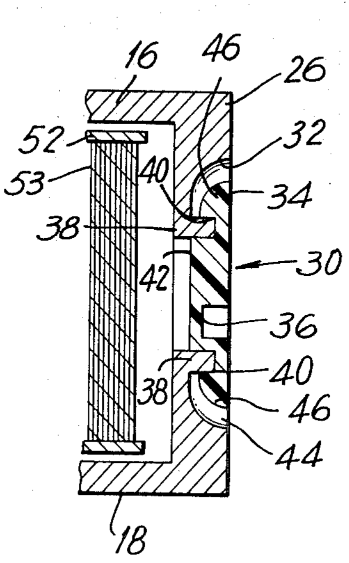
FIG. 2 is a fragmentary sectional view taken on line 2—2 of FIG. 1.

Referring to the drawing in detail, and initially to FIG. 1 thereof, it will be seen that a tape cassette 10 embodying the present invention, as shown therein, comprises a housing 12 enclosing a rotatable reel (see FIG. 2)

having recording tape wound thereon which is adapted to be dispensed through an aperture 14.

Housing 12 may be a molded one-piece member, or alternatively, formed of separate upper and lower mating sections, as is conventional in the art, with a top wall 16, and a bottom wall 18 joined by a pair of end walls 20, 22 and side walls 24, 26 to form an integral housing. Aperture 14 is formed in front side wall 20, and a safety device 30 is mounted in the side wall 26 for preventing inadvertent erasure of pre-recorded information on the tape within the cassette when the casette is placed within a recording and reproducing apparatus.

Figure 3:
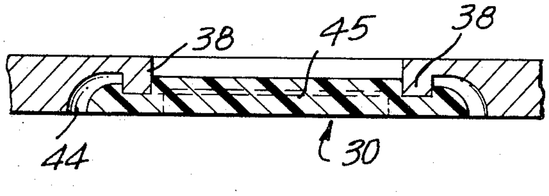
FIG. 3 is a fragmentary sectional view taken on line 3—3 of FIG. 1.

Safety device 30 is, as more fully explained hereinafter, adapted to engage the actuator arm of a switch positioned adjacent the recording and reproducing station of a tape recording and reproducing apparatus, to control the recording circuit of the apparatus. One embodiment of safety device 30 is illustrated in FIGS. 2 and 3 wherein it is seen that the device is formed as a generally flat elongated member, made of rubber, plastic, or other suitable flexible material and mounted in recess 32 formed in wall 26. Member 30 has a generally flat exterior surface 34 having an elongated recess 36 formed therein below the central axis of the member. Surface 34 and the base of recess 36 define first and second switch control surfaces which are adapted to selectively engage the actuator arm of the switch, as described hereinafter.

Recess 32 is provided with two pairs of outwardly extending studs 38 which are adapted to be frictionally engaged in complementary recesses 40 formed in the rear surface 42 of member 30. The extreme dimensions of member 30 are somewhat smaller than the dimensions of recess 32 so that a space 44 is provided between the peripheral edge of safety device 30 and the walls of recesses 32 and into which a fingernail or prying device may be inserted to remove safety device 30 from studs 38. The frictional engagement of studs 38 and recesses 40 is sufficient to hold the safety device 30 in the cassette in the manner shown during use in the recording and reproducing apparatus and for storage purposes and yet the safety device is readily removed by the operator's finger when desired. It is noted that additional frictional contact is achieved by making the central depth of member 30 somewhat larger than the depth of the flange portion 46 formed about the periphery of the device adjacent the walls of recess 32. Further, this additional depth is utilized to accommodate recess 36.

Figure 4:
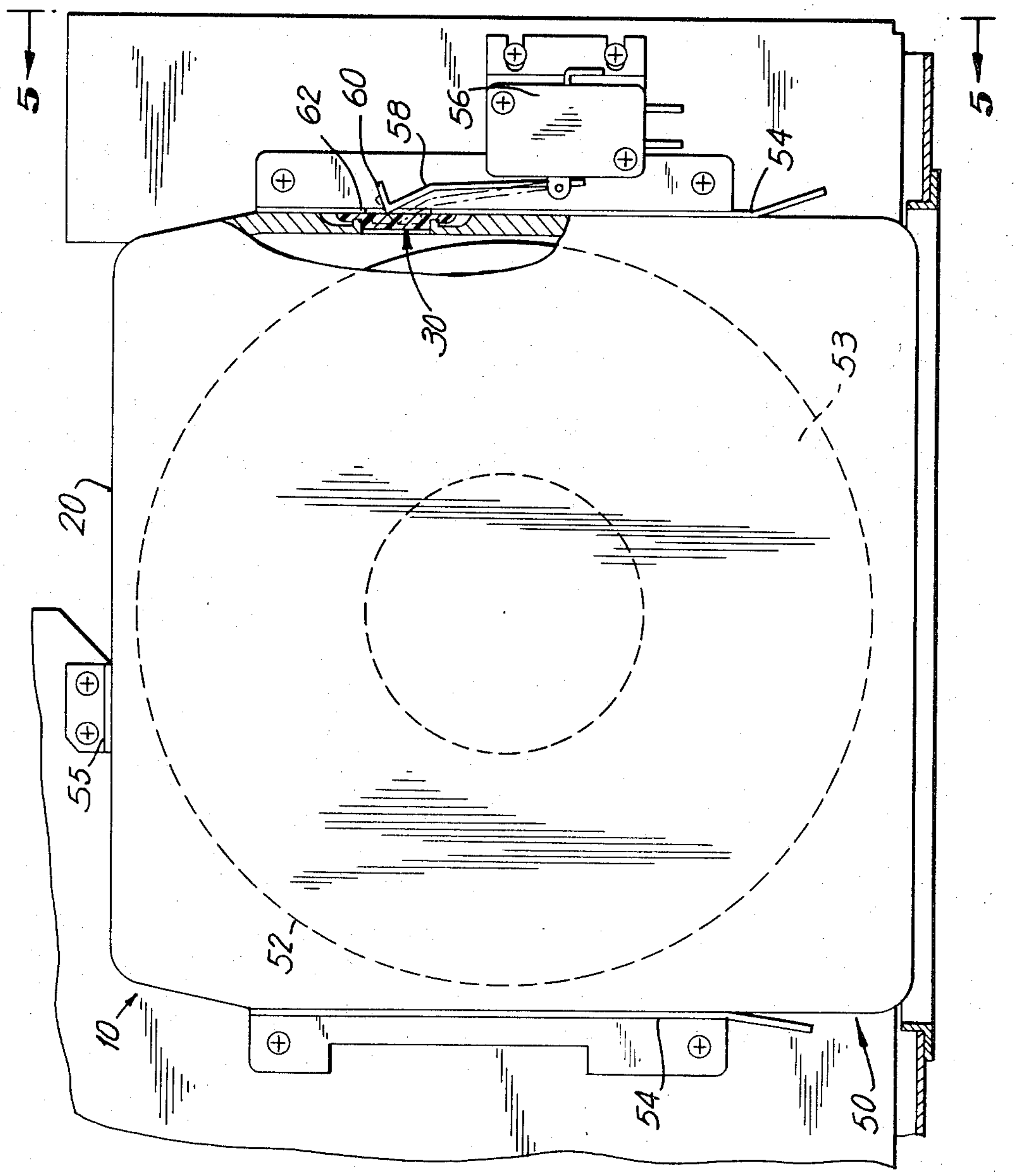
FIG. 4 is a plan view of a tape cassette according to an embodiment of the present invention located at the recording station of a tape recording and reproducing apparatus.

Referring now to FIG. 4, cassette 10 is illustrated in position at the recording and reproducing station 50 of a tape recording and reproducing apparatus. The cassette contains a reel 52 rotatably mounted therein on which recording tape 53 is wound for use in the recording and reproducing apparatus. Tape 53 is dispensed from reel 52 through aperture 14 in the front wall 20 to the recording head and take-up reel (not shown). Typically, the cassette is held in the recording and reproducing station by a pair of spring plates 54 which are adapted to engage sides 24 and 26 of the cassette and maintain front edge 20 thereof against stop member 55, thereby properly locating the cassette in station 50.

A control switch 56, which may for example be a conventional microswitch, is provided adjacent recording and reproducing station 50 which is adapted to control the operating modes of the recording and reproducing circuit of the apparatus. Control switch 56 includes an actuator arm 58 which is adapted to engage the surface 34 of safety device 30 in one of the operative positions thereof. The free end 60 of actuator 58 extends through an aperture 62 formed in the adjacent spring plate 54 in order to grant access for free end 60 to surface 34.

Figure 5:
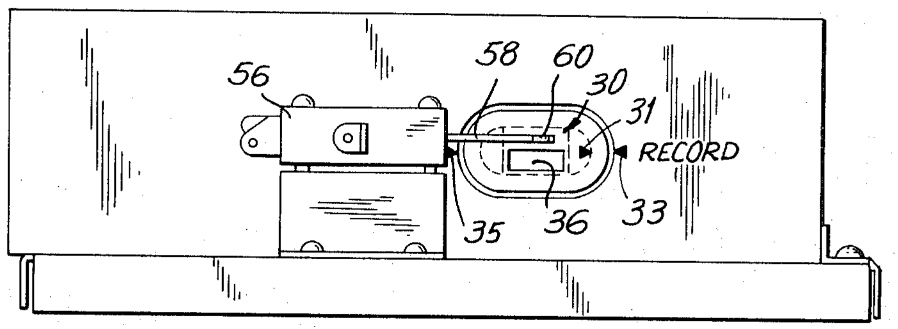
FIG. 5 is a side view taken on lines 5—5 of FIG. 4.
Figure 6:
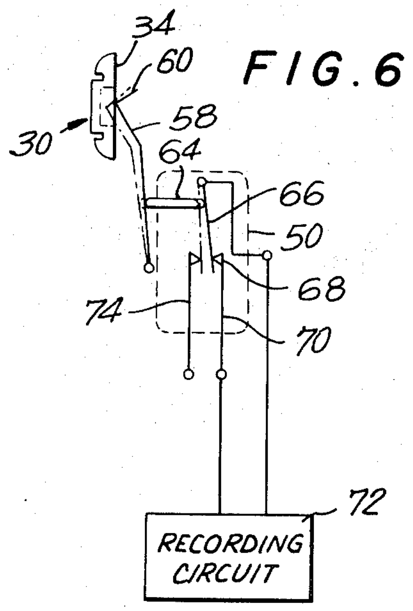
FIG. 6 is a schematic circuit diagram of the recording circuit and control switch therefor.

In FIG. 5, spring plate 54 adjacent switch 56 has been removed for clarity, and as seen therein, actuator 58 is positioned so that its free end 60 engages the flat surface 34 above central axis of the safety device 30. In this position switch 56 is closed so that the recording circuit of the device is placed in operation. The operation of switch 56 is more clearly illustrated in FIG. 6 wherein it is seen that actuator member 58 is operably connected through a control rod 64 with spring contact member 66 of switch 56. When free end 60 of actuator 58 is engaged against surface 34 of safety device 30 (as shown in solid lines in FIG. 6) control rod 64 urges contact 66 into engagement with contact 68 on lead 70 of recording circuit 72. Thus, the circuit is closed and the recording and reproducing circuit which is operatively connected to a microphone or television camera in a conventional manner for electronic sound or video tape recording, is placed in its operative mode.

After the recording operation is completed, it is often desirable to preserve the information recorded on the tape and to prevent inadvertent erasure thereof as would occur if the cassette were placed in recording and reproducing apparatus for recording new information thereon. In that case, the operator of the apparatus simply removes safety device 30 from recess 32, turns the device 180° and reinserts it in recess 32 on studs 38. Thus, in the event the tape cassette 10 is again placed within the recording and reproducing apparatus, recess 36 will be presented to the free end 60 of switch 56. Free end 60 will thence be urged by spring contact member 66, through control rod 64 into recess 36 (as shown in dotted lines in FIG. 6) and thus contact 66 will be engaged with contact 74, which for example may be a ground contact, so that a portion of the recording circuit 72 is open whereby the recording circuit is placed in an inoperative mode and thus it would not be possible to record over the previously recorded information on the tape within the cassette. Therefore, it is seen that a convenient system is provided for preventing inadvertent erasure or re-recording on a tape having pre-recorded information which is desired to be retained.

Safety device 30 and cartridge 10 may be conveniently indexed to give the operator a ready reference as to the operative position of the device and thus inform him whether or not recording will be possible upon insertion of the cartridge within the recording and reproducing apparatus.

As seen in FIGS. 1 and 5, safety device 30 is provided with indicia 31, which may for example take the character of an arrowhead, positioned on the longitudinal axis of the device. Cassette 10 may have a corresponding arrowhead 33 and the legend "RECORD" at one side thereof so that when surface 34 is presented for contact with free end 60 of actuator arm 58 the arrowheads will be in alignment and thus inform the operator that the cartridge is in condition for recording. On the other hand, when safety device 30 is rotated 180° to place the cartridge in a condition in which it would not be possible to re-record on the tape, arrowhead 31 would be aligned with a corresponding arrowhead 35 at the opposite side of recess 32. Cassette 10 is legended adjacent arrowhead 35 with the word "NO RECORD" or the like, so that the operator is given an indication of the condition of the cartridge.

While the previously described embodiment of the present invention has been discussed in relation to a single reel cassette in which the recording tape is distributed to a take-up reel, it is contemplated that a safety device 30 in accordance with the present invention may similarly be used, to a like advantage, in a cassette having two reels mounted on parallel axes, as is well known in the art.

Figure 7:
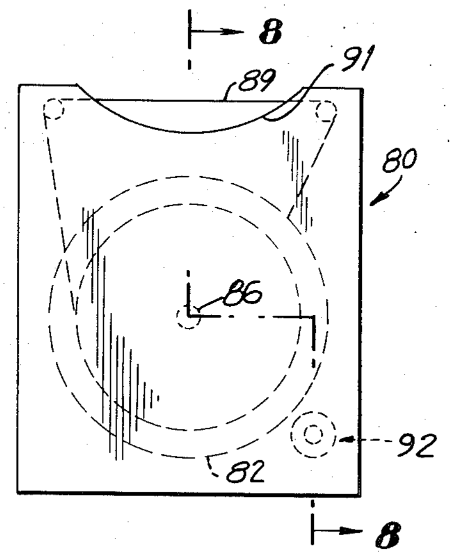
FIG. 7 is a plan view of another embodiment of a tape cassette in accordance with the present invention.
Figure 8:
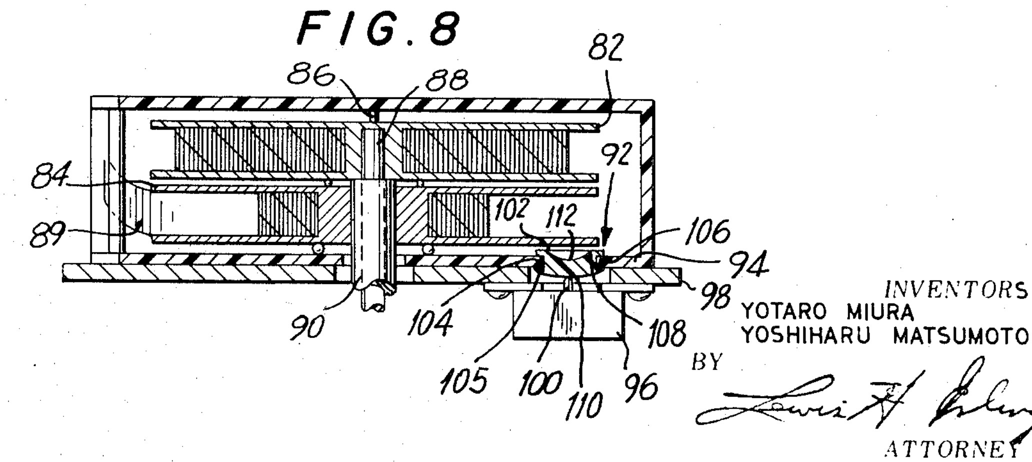
FIG. 8 is a sectional view taken on line 8—8 of FIG. 7.

Yet another type of cassette in which the present invention may be employed is illustrated in FIGS. 7 and 8 wherein a cassette 80 is disclosed having a pair of reels 82, 84 mounted on a common axis 86 in a conventional manner. As seen therein, reel 82 is mounted on an inner drive shaft 88 and reel 84 is mounted for rotation on a shaft 90 enclosing inner shaft 88, as is generally conventional in the art, whereby an endless recording tape 89 is adapted to be continuously moved from one reel to another and past an opening 91 in the cassette at which the tape is engaged by the recording and reproducing head of the apparatus.

Another embodiment 92 of the safety device or control member of the present invention is illustrated in conjunction with the cassette shown in FIGS. 7 and 8, however it is contemplated that this embodiment of the safety device may also be utilized with either of the previously described cassette. In the illustrated embodiment control member 92 is mounted in the base of cassette 80 and control switch 96 is mounted in the base 98 of the recording and reproducing apparatus with its control rod 100, which corresponds to control rod 64 of the prior embodiment, in direct contact with the safety device. As seen in the drawings, safety device 92 is a generally annular member 102 which is formed of a relatively flexible material and has a peripheral groove 104 which is adapted to be frictionally engaged with the edge 106 of an aperture 108 formed in base 94. As seen in FIG. 8, member 102 is generally arcuate in cross-section and has a pair of opposed surfaces 110 and 112. Surface 110 corresponds to the surface 34 of safety device 30 of the prior embodiment whereas surface 112 corresponds to recess 36 therein. Disc 102 may be mounted in aperture 108 with either surface 110 or 112 facing rod 100, and it is evident that surface 110 will extend substantially further beyond base member 94 than will surface 112. Thus it is seen that when surface 110 is engaged with rod 100 the contacts within switch 96 are closed so that the recording circuit is placed in its operative mode to permit recording on tape 89. On the other hand, when it is desired to protect the tape within the cassette from inadvertent erasures, disc 102 is removed from the cassette as by inserting a fingernail beneath the flanges 105 produced by groove 104 and reversed, so that surface 112 is presented to rod 100, whereby the contacts within switch 96 will be open so that the recording and reproducing circuit will be placed in its inoperative mode.

It is noted that safety device 92 and cartridge 80 may be legended in a manner similar to cartridge 10 and safety device 30 as described above; however, it is also noted that in this embodiment of the safety device, the indicia are not as necessary since the operator may more readily observe the position of the safety device and in fact feel whether surface 110 or depression 112 is facing outwardly for contact with rod 100 in order to determine the position of the safety device.

It will be apparent that a relatively simple and inexpensive safety device is thus provided for tape cassettes or the like which will prevent the inadvertent erasure of information pre-recorded on the tape within the cassette. While the present invention thus is adapted to prevent reuse of a cassette containing recorded information therein, the cassette remains reusable in the event that erasure of this information is later desirable as the safety device is capable of being removed and replaced, or adjusted without permanent damage to the cassette.

Although illustrative embodiments of the present invention have been described herein with reference to the accompanying drawings, it is to be understood that the invention is not limited to these precise embodiments and that various changes and modifications may be effected therein by one skilled in the art without departing from the scope or spirit of this invention.

What is claimed is:

1. A tape cassette for use in tape recording and reproducing apparatus that includes cassette locating means for positioning the cassette at an operative station in said apparatus and switch means having an actuating element that extends adjacent said station and is movable between first and second positions to condition said switch means for selectively placing the recording circuit of said apparatus in its operative and inoperative modes, respectively; said cassette comprising a housing with a wall portion which is adjacent said actuating element of the switch means when the cassette is positioned at said station, a switch control element having first and second switch control surfaces thereon, and cooperative means on said switch control element and wall of the cassette housing for removably retaining said switch control element in said wall portion in a selected one of first and second orientations relative to said wall, said first and second switch control surfaces being disposed on said switch control element to selectively engage said actuating element and thereby dispose the latter in said first and second positions thereof where said cassette is disposed at said operative station with said switch control element in said first and second orientations, respectively, relative to the housing wall.

2. A tape cassette according to claim 1, in which said switch control element is a generally flat body having said first and second switch control surfaces on one of the faces of said body which is directed outwardly when said switch control element is mounted on said wall portion, one of said switch control surfaces is recessed relative to the other of said switch control surfaces, said first and second switch control surfaces are asymmetric with respect to the center of said one face, and said switch control element is turned about said center in said first and second orientations.

3. A tape cassette according to claim 1, in which said wall, adjacent said portion thereof, and said switch control element have cooperating indicia thereon to visually indicate in which of said first and second orientations said switch control element is disposed.

4. A tape cassette according to claim 1, in which said portion of the wall has an opening therein, said switch control element is constituted by a resilient disc having a peripheral groove adapted to frictionally engage the edge of said opening and constituting, with said edge, said cooperative means for removably retaining the switch control element, said disc is engageable in said opening with either of the opposite faces thereof directed outwardly for engagement by said actuating element, and said first and second switch control surfaces are respectively disposed on the opposite faces of said disc.

5. A tape cassette according to claim 4, in which said opposite faces of the disc are respectively concave and convex to define said first and second switch control surfaces.

References Cited

UNITED STATES PATENTS

| | | | |
|---|---|---|---|
| 2,466,514 | 4/1949 | Vagtborg | 179—100.2 D |
| 3,417,387 | 12/1968 | Rayfield | 179—100.2 D |
| 3,416,150 | 12/1968 | Lindberg | 179—100.2 Z |

BERNARD KONICK, Primary Examiner

R. S. TUPPER, Assistant Examiner